United States Patent [19]
Merritt, Jr.

[11] 3,934,098
[45] Jan. 20, 1976

[54] TELEPHONE MESSAGE TRANSFER CIRCUIT

[75] Inventor: George A. Merritt, Jr., Tustin, Calif.

[73] Assignee: San/Bar Corporation, Santa Ana, Calif.

[22] Filed: Apr. 1, 1974

[21] Appl. No.: 457,116

[52] U.S. Cl................................. 179/84 C; 179/99
[51] Int. Cl.²......................................... H04M 1/64
[58] Field of Search........ 179/99, 84 C, 84 L, 81 C, 179/18 BG, 18 BH, 18 BD, 18 BE, 1 MN, 27 FG

[56] References Cited
UNITED STATES PATENTS

| | | | |
|---|---|---|---|
| 2,884,491 | 4/1959 | Breen................................ | 179/84 L |
| 3,050,592 | 8/1962 | Burgener........................... | 179/84 C |
| 3,322,903 | 5/1967 | Chapin............................... | 179/81 C |
| 3,532,832 | 10/1970 | Hestad et al...................... | 179/84 C |

*Primary Examiner*—Kathleen H. Claffy
*Assistant Examiner*—Gerald L. Brigance
*Attorney, Agent, or Firm*—Jackson & Jones Law Corporation

[57] ABSTRACT

A message waiting transfer circuit for use in a telephone system is described. An attendant telephone set is arranged to monitor the calls received by a plurality of principal telephone sets. The attendant set includes a receiver (and transmitter) and a separate line or principal set selection key associated with each principal set in the system. Actuation of a selected line selection key and the removal of the receiver from its cradle or switch hooks at the attendant set seizes the telephone line conductors (pair) associated with the selected principal set to enable the operator at the attendant set to answer an incoming call, etc.. The attendant set includes a message control key for providing a message waiting signal to any selected principal set. A separate message waiting transfer circuit is connected between each principal set and the attendant set. Each message waiting transfer circuit includes a first relay responsive to the seizure of the line conductors of the associated principal set by the attendant set and a second relay responsive to the operation of the first relay and to the message control key for transferring a message waiting signal to the associated principal set.

The message waiting transfer circuit may be employed separately or in conjunction with a ring transfer circuit which automatically transfers ringing signals from the associated principal set to the attendant set after a predetermined time delay to enable the attendant set operator to answer calls for absentee principal set users.

9 Claims, 2 Drawing Figures

TELEPHONE MESSAGE TRANSFER CIRCUIT

BACKGROUND OF THE INVENTION

1. Field of the Invention

This invention relates generally to telephone systems and more particularly to message transfer circuits for allowing an attendant set to transfer a message to a selected principal set.

2. Description of the Prior Art

Telephone answering systems which enable a centrally located telephone operator to monitor the calls received by a plurality of subscriber telephones are in widespread use. Early telephone answering systems required that the subscriber contact the operator, normally by telephone, to find out if anyone had called while he was away and left a message. Progress in the telephone art has resulted in the development of circuits which enable the operator to answer a call directed to a principal set and leave a message at that principal set in the form of a visual signal, e.g., lamp, informing a subscriber that a message is waiting at the operator's location. In the past such message waiting circuits have required the use of a separate message circuit between each subscriber's set and the operator's set. Each such message circuit required the actuation of an associated message key or switch at the operator's location to energize the message lamp at the subscriber's set. Thus, a separate message key was required at the operator's location for each subscriber's set. The present invention provides an improvement over the prior art message waiting signal transfer circuitry in terms of cost, complexity and a reduction in the time required of the central operator.

SUMMARY OF THE INVENTION

Briefly described, the present invention relates to a message waiting transfer circuit for enabling an attendant telephone set operator to monitor the calls received by a plurality of principal sets and transfer a message waiting signal to a selected principal set. The attendant set includes means such as a receiver (and transmitter) and line or principal set selection switches for seizing the telephone lines associated with any selected principal set. The attendant set further includes message control means such as a message waiting switch for providing a message waiting signal to any selected principal set.

A separate message waiting transfer circuit is connected between each principal set and the attendant set. Each message waiting transfer circuit includes means responsive to the seizure of the telephone line conductors of the associated principal set by the attendant set for providing a message enabling signal. Each transfer circuit further includes gating means responsive to the message enabling signal and to the message control means at the attendant set for transferring a message waiting signal to the principal set. The circuit may also include means for transferring ringing signals from the associated principal set to the attendant set (after a predetermined time delay, if desired) to inform the operator at the attendant set of an unanswered incoming call.

DESCRIPTION OF THE PREFERRED EMBODIMENT

Figure 1:
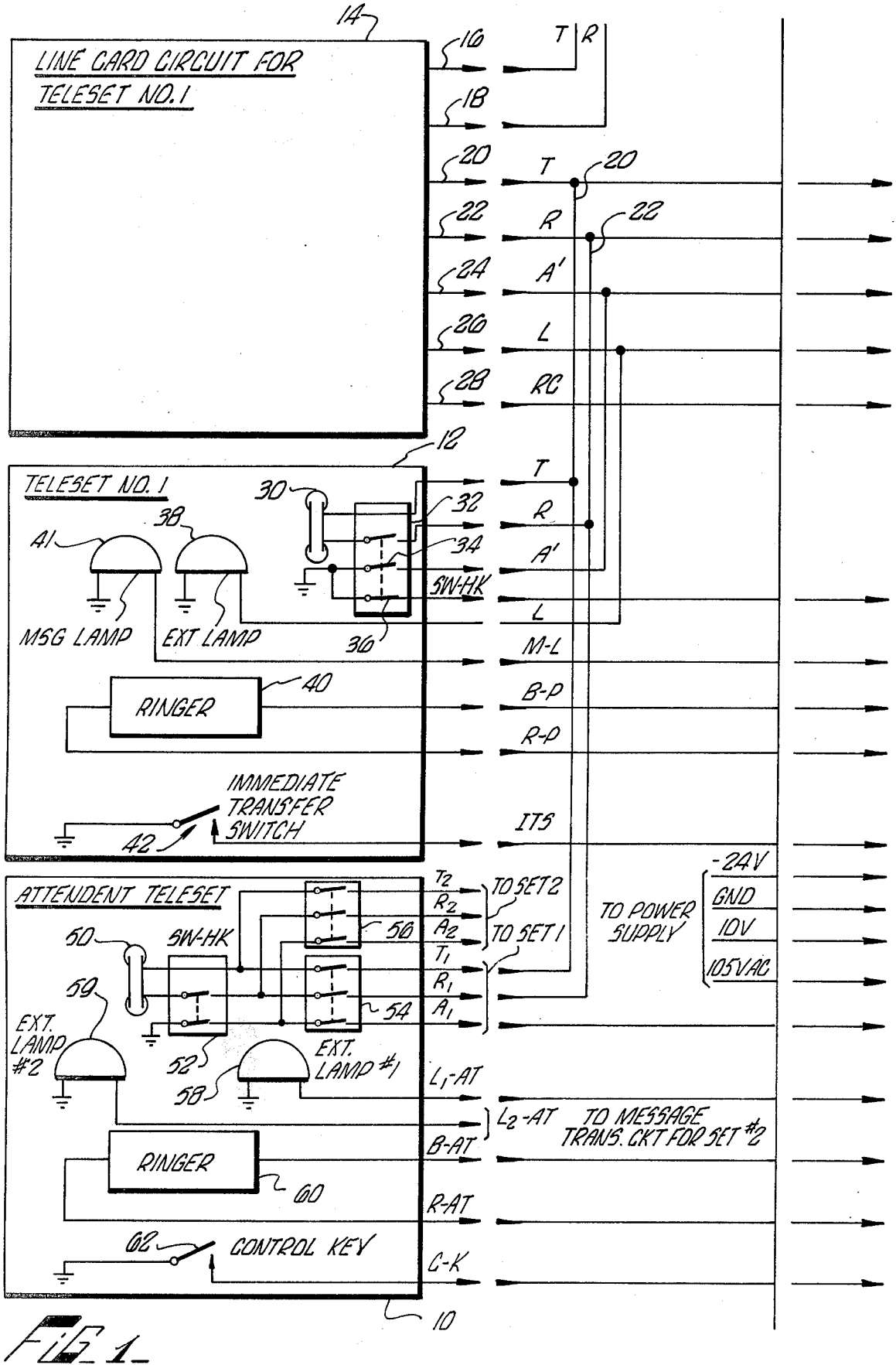
FIG. 1 is a block diagram illustrating a telephone monitoring system including an attendant telephone set and one principal telephone set.

Referring now to the drawings, an attendant telephone set 10 is adapted for monitoring the calls to be received by plurality of principal telephone sets, only one of which is shown as telephone set No. 1 and referred to by the reference numeral 12. A conventional line card circuit 14 is coupled between the incoming pair of telephone line conductors marked T and R and the principal telephone set. The line card circuit 14 may be of the type illustrated in U.S. Pat. No. 3,647,983.

The line card circuit 14 is connected to the incoming tip and ring conductors by lines 16 and 18 and provides output tip and ring lines 20 and 22. The line card circuit 14 includes a conductor A' and marked 24 as its conventional A lead for providing supervisory and control information to the line card circuit in a conventional manner. The line card circuit also includes an L (lamp) lead 26 and an R-C (ring control) lead 28 for providing conventional electrical signals to the lamps and audible (ringer) signaling devices of the associated telephone sets.

The principal telephone set No. 1 includes a conventional receiver (and transmitter) 30 adapted to be connected to the tip and ring leads 20 and 22 by a switch hook mechanism 32 in a conventional manner. The switch hook mechanism 32 also includes an A lead switch 34 for providing a ground connection to the A' lead 24 when the receiver is removed from the switch hook 32 to connect the receiver across the telephone line conductors as is well known. The switch hook mechanism 32 includes an additional switch 36 which normally provides a ground connection to the lead marked SW-HK when the receiver is on the switch hook 32. The switch 36 is opened to remove the ground connection from the lead marked SW-HK when the receiver is taken off the switch hook 32 to answer or place a call.

The principal set 12 includes an extension lamp 38 which is energized by the line card 14 in a conventional manner to indicate the presence of an incoming call, etc. A message lamp 41 is connected to an M-L (message line) lead for energization by the attendant telephone set in a manner described. The principal telephone set also includes an audible signaling device or ringer 40 connected to leads BP (ring battery-principal) and RP (ring return-principal) for energization by the line card 14 through the ring transfer and message waiting circuit of FIG. 2 as will be described. The principal telephone set 12 further includes an immediate transfer switch 42 which is connected to a lead ITS (immediate transfer switch) for providing an immediate transfer of the ringing signals to the attendant telephone set as will be described.

The attendant telephone set 10 includes a conventional receiver (and transmitter) 50, and a switch hook mechanism 52 for connecting a receiver 50 to a pair of telephone line conductors associated with a selected principal set and for grounding the respective A lead in a conventional manner. The attendant set includes a plurality of push buttons or principal set selection switches, only two of which are shown as 54 and 56. The line selection switch or key 54 includes switches for connecting the receiver 50 to the tip and ring leads of set No. 1 and for connecting the $A_1$ lead to ground as shown. The line key 56 when actuated connects the receiver 50 of the attendant set to the tip and ring leads of the principal set No. 2 (not shown) and grounds the A lead associated with that set. It should be noted that a separate line selection key must be included at the attendant telephone set for each of the principal sets to be monitored. The attendant telephone set 10 also includes a separate extension lamp for each principal set to be monitored to identify for the operator which principal set is busy, or receiving an unanswered call. Only two extension lamps 58 and 59 are illustrated in FIG. 1.

The extension lamp 58 is energized by signals on line L-AT (lamp-attendant) indicating that principal set No. 1 is receiving, answering a call, etc. An audible signaling device or ringer 60 is energized by leads B-AT (ring battery-attendant) and R-AT (ring return-attendant) from the ring transfer circuit of FIG. 2 as will be described. A control key 62 is provided at the attendant telephone set to ground lead C-K (control key) for transferring a message waiting signal to a selected principal set.

Figure 2:
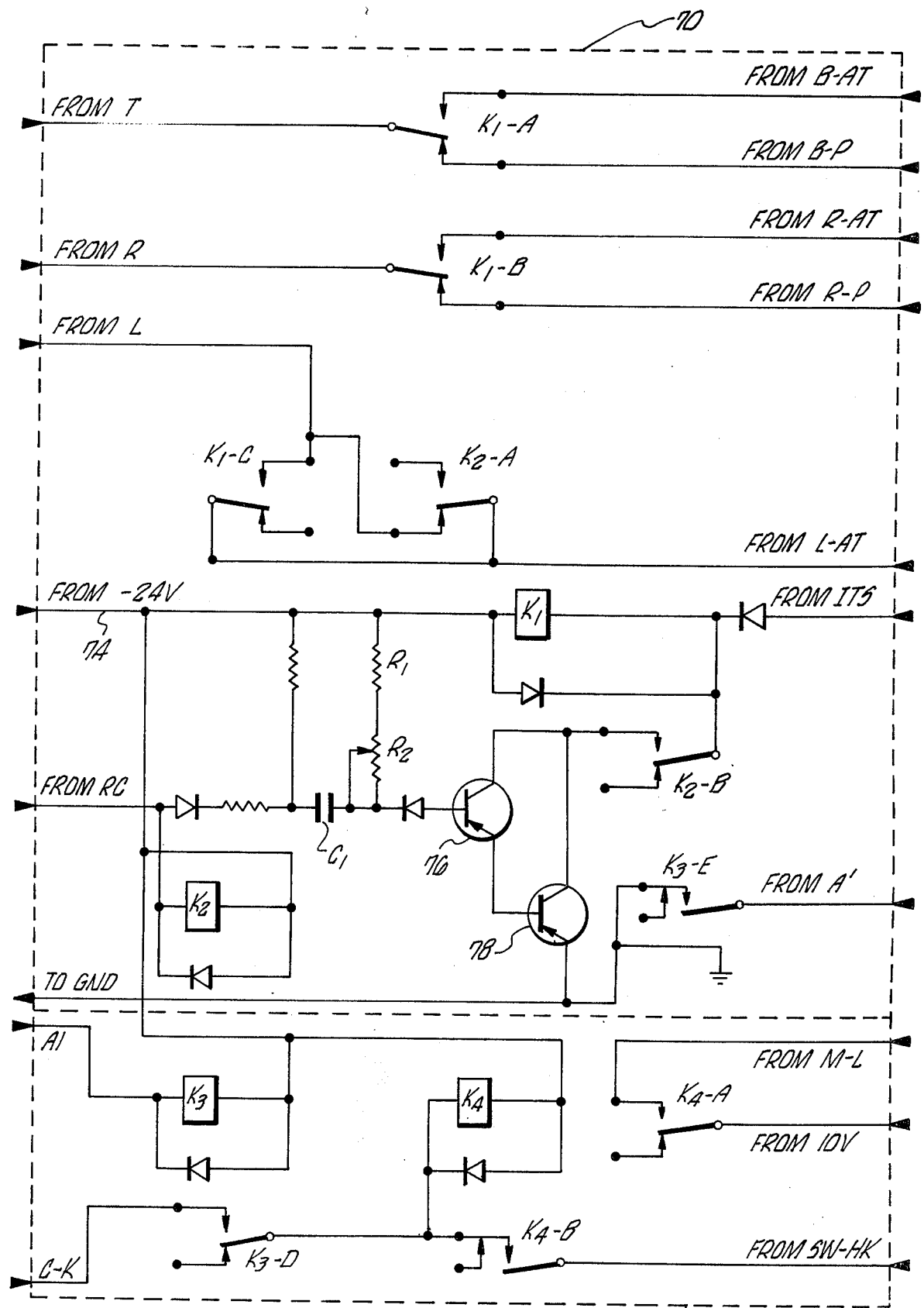
FIG. 2 is a schematic circuit diagram of a ring transfer and message waiting transfer circuit in accordance with the present invention.

Referring now to FIG. 2, a ring transfer circuit is indicated generally at 70 and a message waiting transfer circuit is indicated generally at 72. In response to an incoming call the ring control lead R-C of the ring transfer circuit 70 is grounded by the line card circuit 14. This action energizes a relay K2 by completing the circuit through the relay K2 from a $-24$ volt power supply connected to a lead 74. The ground connection to the R-C lead immediately charges a capacitor C1 which in turn discharges through resistors R1 and R2 at a rate determined by the resistance value of the resistor of R2. The resistance value of R2 can be changed to provide time delays of one to thirty seconds. Operation of relay K2 closes contact K2-B which in turn connects relay K1 to the collector of a pair of switching transistors 76 and 78. The transistors 76 and 78 will switch on when the potential across the capacitor C1 reaches a predetermined level thereby energizing relay K1. Operation of relay K2 also causes contact K2-A to open the connection of the lamp lead L from the principal set to the attendant lamp energizing lead L-AT.

When the incoming call is answered at the principal telephone set the line card circuit 14 removes the ground from the ring control lead R-C which in turn de-energizes the relay K2 and terminates the delay operation of the capacitor C1 and the resistors R1 and R2. The relay K1 is also disconnected from the transistors 76 and 78 (via the opening of contact K2-B) to remain unenergized and prevent any ring signal transfer. The relay contact K2-A reconnects the lead L-AT to the lead L from the line card circuit 14 to energize extension lamp 58 at the attendant telephone set informing the operator that the principal set No. 1 is busy.

If the incoming call is unanswered at the principal set, the relay K1 will be energized by transistor 76 and 78 at the end of the predetermined time delay, e.g., one to thirty seconds. Energization of relay K1 operates contact K1-C to connect the lead L-AT to the L lead from the line card circuit to provide a lamp flash on extension lamp 58 indicating that principal set No. 1 is receiving an unanswered call. The contacts K1-A and K1-B transfer the ringing voltage from the principal set No. 1 via the T and R leads to the B-AT and R-AT leads to actuate the ringer 60 at the attendant telephone set.

When the call is answered at the attendant telephone set by actuation of the line selection key 54 and the removal of the receiver from the switch hook, the $A_1$ lead is grounded. The ground connection to the $A_1$ lead operates the K3 relay of the message waiting circuit 72 through the negative 24 volt supply on lead 74. The operation of the K3 relay closes contact K3-E grounding the A' lead of the line card circuit 14. This action removes the ground from the ring control lead R-C, thus terminating the ringing signal and de-energizing relays K2 and K1. It should be noted that the principal set user may cause an immediate ring transfer to occur by operating the immediate transfer switch 42 at the principal telephone set to continuously energize relay K1. With relay K1 energized all incoming ringing signals will be transferred through the contacts K1-A and K1-B to the attendant telephone set.

The operation of the message waiting transfer circuit 72 will now be described. Actuation of the line key 54 and the off-hook condition of the receiver 50 at the attendant set grounds the $A_1$ lead and causes the K3 relay to operate as discussed above. Operation of the K3 relay connects the C-K lead to the K4 relay via contact K3-D. The K3 relay thus responds to the seizure of the line conductors of the associated principal telephone set (set No. 1) to provide a message transfer enabling signal, e.g., closure of contact K3-D. The operator at the attendant telephone set may transfer a message waiting signal to the principal telephone set No. 1 by operating the control key 62 to provide a ground on lead C-K which energizes K4 relay and closes contacts K4-A and K4-B. The closure of contact K4-A connects the lead M-L to the ten volt alternating supply voltage via lead 10 VAC, thereby energizing the message lamp 41 at the principal telephone set. The K4 relay thus functions as a gating means and transfers a message waiting signal to the associated principal set in response to the presence of the enabling signal (closure of contact K3-D) and operation of the message control means (control key 62) at the attendant set. The closure of contact K4-B connects ground to the K4 relay via lead SW-HK and switch 35 at the switch hook 32 of the principal telephone set. The operator at the attendant telephone set may now replace the receiver and open the line key 54. The K4 relay will remain energized through its contact K4-B, thereby maintaining the message lamp 41 energized until the receiver 30 at the principal set is taken off-hook, thereby opening switch 36.

It should be noted that the operator at the attendant telephone set may transfer a message waiting signal to any of the principal telephone sets independently of intercepting a call directed to such set by merely operating the associated line selection key, removing the receiver from the switch hook and operating the control key 62.

There has thus been described an improved message waiting transfer circuit which may be used with or without a ring transfer circuit for enabling an operator at an attendant set to monitor and transfer messages to a plurality of principal sets.

What is claimed is:

1. In a telephone system in which an attendant telephone set monitors the calls received by a plurality of principal telephone sets and transfers a message waiting signal to any selected one of the principal sets, the attendant set having means for seizing the line conductors associated with any of the principal sets, and further having message control means for providing a message waiting signal to any selected principal set, the improvement of a message transfer circuit individually connected between each principal set and the attendant's set, each transfer circuit comprising:

means responsive to the seizure of the line conductors of the associated principal set by the attendant set for providing a message transfer enabling signal; and gating means responsive to the message transfer enabling signal and to the message control means for transferring a message waiting signal to the principal set.

2. The combination of claim 1 wherein the means responsive to the seizure of the line conductors includes a first relay.

3. The combination as defined in claim 2 wherein the gating means includes a second relay.

4. The combination of claim 1 wherein the telephone system is arranged to provide ringing signals to the principal sets to signify an incoming call, the transfer circuit further including means for transferring ringing signals from the associated principal set to the attendant set.

5. In a telephone system in which an attendant's telephone set monitors a plurality of principal telephone sets connected to an exchange via pairs of line conductors, each of the principal sets having an electrically actuated message indicator and a receiver which is connected across the associated pair of line conductors in the off-hook condition, the attendant set including a receiver and a line selection key individually associated with each principal set for connecting the receiver of the attendant set across the pair of line conductors associated with the principal set when the receiver is in the off-hook condition, the attendant set further including an A lead associated with each principal set for providing a line seizure signal in response to the operation of the respective line key and the off-hook condition of the attendant set receiver, a message transfer circuit connected between each principal set and the attendant set which comprises:

first means responsive to the line seizure signal on the associated A lead for providing a message transfer enabling signal; and second means responsive to the message transfer enabling signal and to the operation of the message control key for transmitting a message signal to the message indicator at the associated principal set.

6. The combination as defined in claim 5 wherein the first means includes a first relay which operates in response to the line seizure signal.

7. The combination as defined in claim 6 wherein the second means includes a second relay which operates in response to the concurrent operation of the first relay and the message control key for energizing the message indicator at the associated principal set.

8. The combination as defined in claim 7 including means for maintaining the second relay energized after the first relay and message control key are returned to the off condition.

9. In a telephone system in which an attendant's telephone set monitors the calls and selectively transmits message waiting signals to a plurality of principal telephone sets connected to an exchange via pairs of line conductors, each of the principal sets including (1) a message waiting indicator and (2) a receiver which is connected across the associated pair of line conductorss in the off-hook condition, the attendant's set including (1) a receiver (2) a signal message control key, (3) a line key individually associated with each principal set for connecting the attendant's set receiver in its off-hook condition across the pair of line conductors associated with the selected principal set (4) an A lead associated with each principal set and (5) means for providing a line seizure signal on a selected A lead in response to the operation of the associated line key and the off-hook condition of the receiver, and a separate message transfer circuit connected between each principal set and the attendant's set, the message transfer circuit comprising:

a message waiting signal line for carrying a message waiting signal;

gating means coupled between the message waiting indicator at the associated principal set and the message waiting signal line, the gating means being responsive to the occurrence of a line seizure signal on the A lead for the associated principal set and to the operation of the message control key for transmitting the message signal to the message indicator of the associated principal set.

* * * * *